United States Patent [19]
Colburn et al.

[11] Patent Number: 5,533,079
[45] Date of Patent: Jul. 2, 1996

[54] INVENTORY MONITORING APPARATUS

[75] Inventors: Eric R. Colburn; Max A. Fedor, both of Wexford; Robert G. Gillio, Lancaster; Daniel W. Neu, Pittsburgh, all of Pa.

[73] Assignee: MedSelect Systems, Inc., Cranberry Township, Pa.

[21] Appl. No.: 186,285

[22] Filed: Jan. 25, 1994

Related U.S. Application Data

[63] Continuation-in-part of Ser. No. 9,055, Jan. 25, 1993, Pat. No. 5,404,384.

[51] Int. Cl.⁶ .................................................. G06F 15/24
[52] U.S. Cl. .................................................. 377/6; 364/403
[58] Field of Search ................................ 377/6, 9; 364/403

[56] References Cited

U.S. PATENT DOCUMENTS

| | | | |
|---|---|---|---|
| 1,478,612 | 12/1923 | Lauke | 377/6 |
| 2,663,495 | 12/1953 | Ramsell et al. | 364/403 |
| 2,731,204 | 1/1956 | Darling et al. | 235/98 A |
| 3,197,620 | 7/1965 | Peltier | 377/6 |
| 3,348,030 | 10/1967 | Krause | 377/6 |
| 3,441,719 | 4/1969 | Haller et al. | 377/9 |
| 3,651,478 | 3/1972 | Shandlay | 364/403 |
| 4,528,679 | 7/1985 | Shaitbaz et al. | 377/6 |
| 4,639,875 | 1/1987 | Abraham et al. | 377/15 |
| 4,737,910 | 4/1988 | Kimbrow | 364/403 |
| 4,783,740 | 11/1988 | Ishizawa et al. | 364/403 |
| 4,797,819 | 1/1989 | Dechirot | 377/6 |

*Primary Examiner*—John S. Heyman
*Attorney, Agent, or Firm*—The Law Offices of Byron A. Bilicki

[57] ABSTRACT

Inventory monitoring apparatus capable of real-time counting of objects added to or subtracted from a location whose inventory is to be monitored. The apparatus includes structure for supporting a plurality of objects and at least one lever adapted to be contacted and displaced by movement of the objects to and from the supporting structure. Movement of the lever in one direction triggers a switch which generates a signal indicating that an object is being added to the support structure. Similarly, opposite movement of the lever triggers another switch which generates a signal indicating that an object is being removed from the support structure. A microprocessor receives and counts the signals generated by the switches to provide a real-time total of the quantity and, if desired, the locations of objects borne by the supporting structure.

7 Claims, 6 Drawing Sheets

INVENTORY MONITORING APPARATUS

CROSS REFERENCE TO RELATED APPLICATION

This application is a continuation-in-part of copending U.S. patent application Ser. No. 08/009,055, filed Jan. 25, 1993, now U.S. Pat. No. 5,404,384 of the same title.

FIELD OF THE INVENTION

The present invention relates in general to inventory monitoring apparatus and, in particular, to apparatus for real-time counting of objects.

BACKGROUND OF THE INVENTION

Apparatus for monitoring inventories of consumer goods and other products are known. The broad variety of such apparatus and their myriad modes of operation reflect not only the configurational and dimensional peculiarities of the objects whose inventory or supply is to be monitored but also the purpose for the monitoring, e.g., product identification and tracking, accounting, etc., as well as the manner in which inventory is to be taken, i.e., continuously, periodically, automatically or selectively.

In this regard, U.S. Pat. No. 3,197,620 describes a system for counting moving objects of different dimensions whereby the objects to be counted contact and displace a pivotable rod which is connected to a counting station. The counting station registers the presence of a moving object when the rod is caused to pivot in the proper direction. As a result, only cumulative tallies of objects moving in the appropriate direction are ascertainable. Such a system may be useful in environments where "one-way" counting is all that is desired or necessary. However, in situations where objects to be counted move in opposite directions past a counting station, i.e., when objects are both added and subtracted from a supply, such a one-way counting system would be of no practical use.

U.S. Pat. No. 4,797,819 teaches an inventory monitoring system for counting the quantity of articles suspended from a peg on a sales display. The system comprises an ultrasonic energy emitting and receiving gun which engages with the free end of a peg upon which merchandise is suspended. The distance between the free end of the peg and the nearest article is representative of the number of articles suspended on the peg. A microcomputer within the gun calculates this distance as a function of the time that is required for ultrasonic energy emitted from the gun to reflect from the nearest article and return to the gun. Although sophisticated, this system is readily susceptible to human error. For example, when the operator fails to properly engage the peg, neglects to appropriately orient the articles before counting, or misdirects the gun, accuracy may be detrimentally affected. Moreover, it can only be used for periodic inventory determinations and cannot provide a continuous real-time count of the articles whose inventory is to be monitored.

Systems for counting garment hangers are disclosed in U.S. Pat. Nos. 4,151,402 and 4,831,638. According to each of these references, a count of the number of garment hangers suspended from a rod is determined by moving the hangers past a stationary photosensor or moving the photosensor past a stationary rod from which the hangers depend. Neither of these arrangements can provide a real-time count of the hangers. Each system merely enables one to periodically obtain a total by moving the hangers past the photosensor or vice versa. However, between scannings, one would not know the quantity of hangers that have been added to or removed from the rod.

U.S. Pat. Nos. 4,419,734 and 4,866,255 propose inventory control systems capable of providing inventory monitoring through determination of the weights of article-supporting platforms (U.S. Pat. No. 4,419,734) and article-receiving containers (U.S. Pat. No. 4,866,255). These systems each involve article-bearing structures in operative contact with strain gauges which are, in turn, connected to computers that must perform sophisticated calculations to ascertain the number of articles borne by the article-bearing structures. The complex nature of such systems render them somewhat cost-ineffective for small-scale inventory monitoring in commercial and noncommercial applications.

A key identification and location system is provided in U.S. Pat. No. 4,673,915. The system includes a plurality of key holders, each of which releasable retains a single key that may be accessed by an authorized user. While capable of indicating the presence or absence of a key, the system has no means for counting, either in real-time or periodically, items whose inventory must be monitored.

A need exists, therefore, for an apparatus of uncomplicated design and construction for providing real-time counting of objects added to or subtracted from a location whose inventory is to be monitored.

SUMMARY OF THE INVENTION

The instant invention provides an inventory monitoring apparatus capable of counting in real-time objects added to or subtracted from a location whose inventory is to be monitored. The apparatus preferably includes means for supporting a plurality of objects, lever means adapted to be contacted and displaced by the objects, switch means operatively connected to the lever means for generating registration signals indicative of placement of the objects onto the supporting means, and the removal of the objects from the supporting means, and means for counting the objects responsive to registration signals generated by the switch means.

According to a first presently preferred embodiment, the inventory monitoring apparatus comprises a housing to which is mounted an object support member such as an elongated peg or rod extending generally longitudinally of the housing. Pivotally mounted within the housing is a lever, a first end of which projects from an opening in the housing. A second end of the lever is connected to a suitable biassing means such as a spring, or the like, whereby the lever is normally biassed to an inoperative position extending generally transversely to the object support member. The lever is constructed and arranged such that its first end protrudes from the housing for a distance sufficient to be contacted and displaced by an object which may be either added to or removed from the object support member. Preferably, the first end of the lever is provided with a notch adapted to receive the object support member such that contact with the lever is assured as an object passes thereby along the object support member. After an object has contacted, displaced and passed the lever (in either direction) the biassing means returns the lever to the inoperative position.

Situated within the housing is a printed circuit board including switch means adapted to generate signals indicative of placement of objects onto and removal of objects from the object support member. In cooperation with the switch means, the lever carries suitable actuator means for causing the switch means to generate the appropriate counting signals. Desirably, the actuator means is a permanent magnet and the switch means are magnetic Hall Effect sensors that are triggered by detection of the magnetic field produced by the permanent magnet. Hence, when the lever is caused to pivot in one direction, the permanent magnet triggers one of the magnetic field detection switches to generate a signal indicating that an object has been placed onto the object support member. Likewise, when the lever is oppositely pivoted, the permanent magnet triggers another of the magnetic field detection switches to generate a signal indicating that an object has been removed from the object support member.

Pursuant to another presently preferred embodiment, the inventory monitoring apparatus comprises a housing to which is mounted an object support member such as an elongated, multiple compartment rack or similar receptacle. Pivotally mounted to the housing are a plurality of levers corresponding in number to the number of storage sites or compartments provided in the rack. A first end of each lever projects from the housing into a respective one of the compartments of the object support member and a second end of each lever extends into the housing. The first end of each lever protrudes from the housing for a distance sufficient to be contacted and displaced by an object which may added to the object support member. Biasing means return the levers to inoperative positions upon removal of objects from the compartments of the object support member.

Similar to the first presently preferred embodiment, situated within the housing is a printed circuit board including switch means adapted to generate signals indicative of placement of objects onto and removal of objects from the object support member. The switch means preferably comprise a plurality of discrete force actuatable switches corresponding in number to the levers, whereby the second end of each lever operates a separate switch. So constructed and arranged, the switch means may generate not only real-time counting signals reflective of the total inventory of objects carried by the object support member, but also real-time signals indicative of those compartments which are occupied and those which are unoccupied at any instant in time. Therefore, when a lever is caused to pivot in one direction such as when an object is placed into a compartment of the object support member, the second end of the lever closes its respective switch. That switch, in turn, generates a registration signal indicating that an object has been placed onto the object support member and at which compartment the object has been added. Conversely, when an object is removed from the object support member, the biasing means returns the lever to its inoperative position whereby the switch is opened. In this position, the switch generates a registration signal which reflects that an object has been removed from the object support member and from which compartment the object has been taken.

An inventory monitoring apparatus according to this latter preferred embodiment is particularly well adapted for supporting and tracking in real-time inventories of objects packaged in generally uniformly sized and shaped containers. For instance, pharmaceuticals and medical equipment supplies such as catheters and angioplasty guide wires are frequently packaged in relatively thin, rectangular boxes. Such goods, or other valuable or potentially dangerous items that may be similarly packaged, and whose inventories should be strictly and accurately monitored, are readily accommodated. Moreover, when different packages in the same rack contain different goods, the further preferred embodiment of the present invention enables the contents of the inventory to be correlated with selected compartments within the rack. Hence, not only may the presence or absence of particular product packages be determined in real-time, but a running inventory of the types of goods contained in the packages may be had as well.

In all embodiments of the present invention, the circuit board may either include or be otherwise electrically connected to a microprocessor for receiving and counting the registration signals as they are generated by the switch means. Pursuant to the latter described embodiment, the microprocessor may also be operable to process registration signals to determine the site from which an object is added to or subtracted from the monitored location. The apparatus may be either AC or DC powered, although DC power is preferred. In this connection, the apparatus preferably further includes a multiple function ribbon cable in communication with the circuit board, which cable possesses both power and data transmission lines. That is to say, the circuit board may receive power from a remote power source via certain lines of the ribbon cable while other lines thereof simultaneously transmit the real-time count being tallied by the microprocessor to a remote display station where the count can be visually monitored. It is also possible that separate power and data transmission cables can be used to in place of the ribbon cable. Moreover, the housing itself may be fitted with a visual display means in addition to or in lieu of the remote display station.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof sown, by way of example only, in the accompanying drawings wherein.

DETAILED DESCRIPTION OF THE INVENTION

Figure 1:
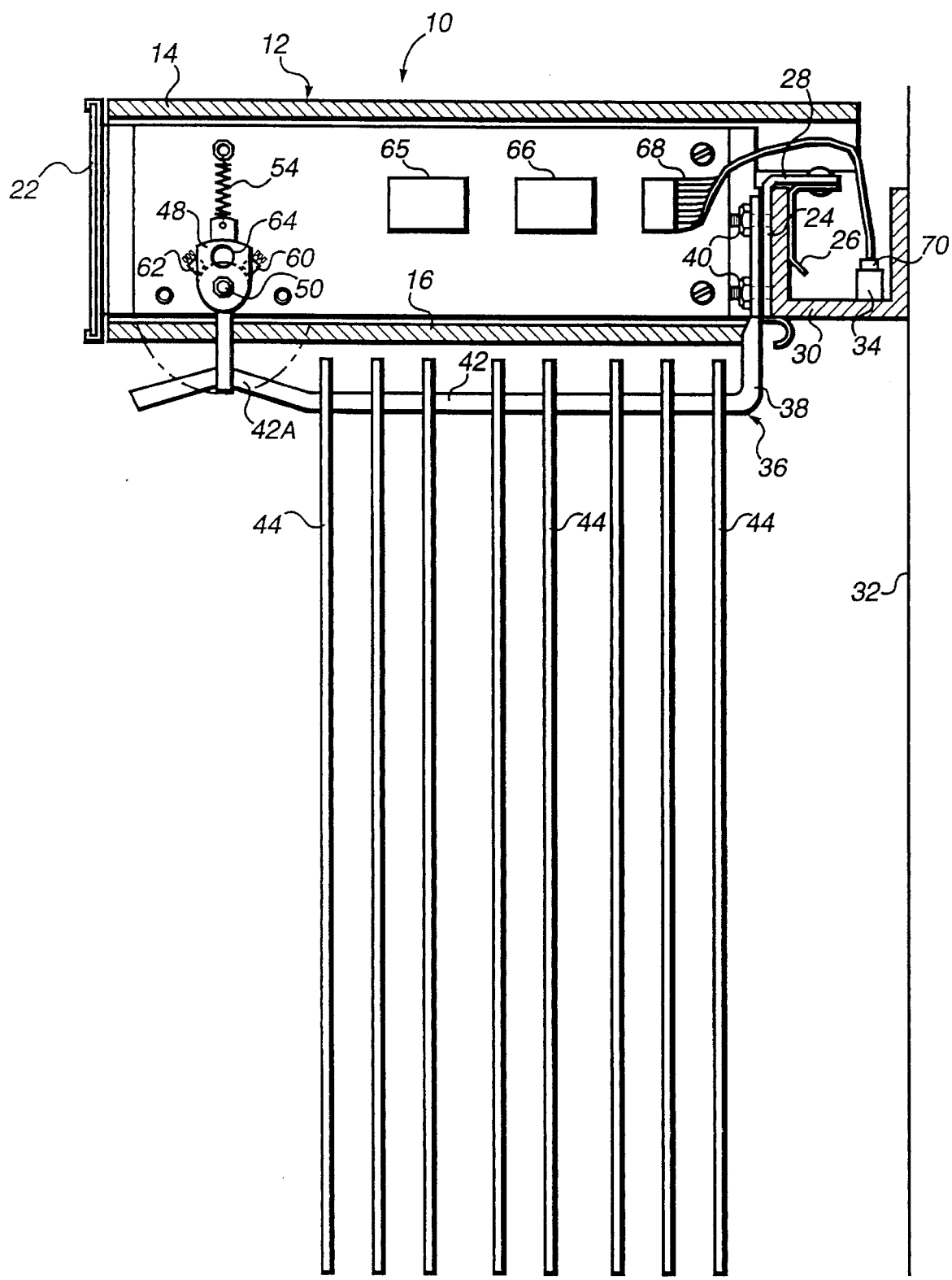
FIG. 1 is a side elevation view of an inventory monitoring apparatus constructed in accordance with a first preferred embodiment of the present invention wherein a housing side wall has been omitted for clarity of illustration.
Figure 2:
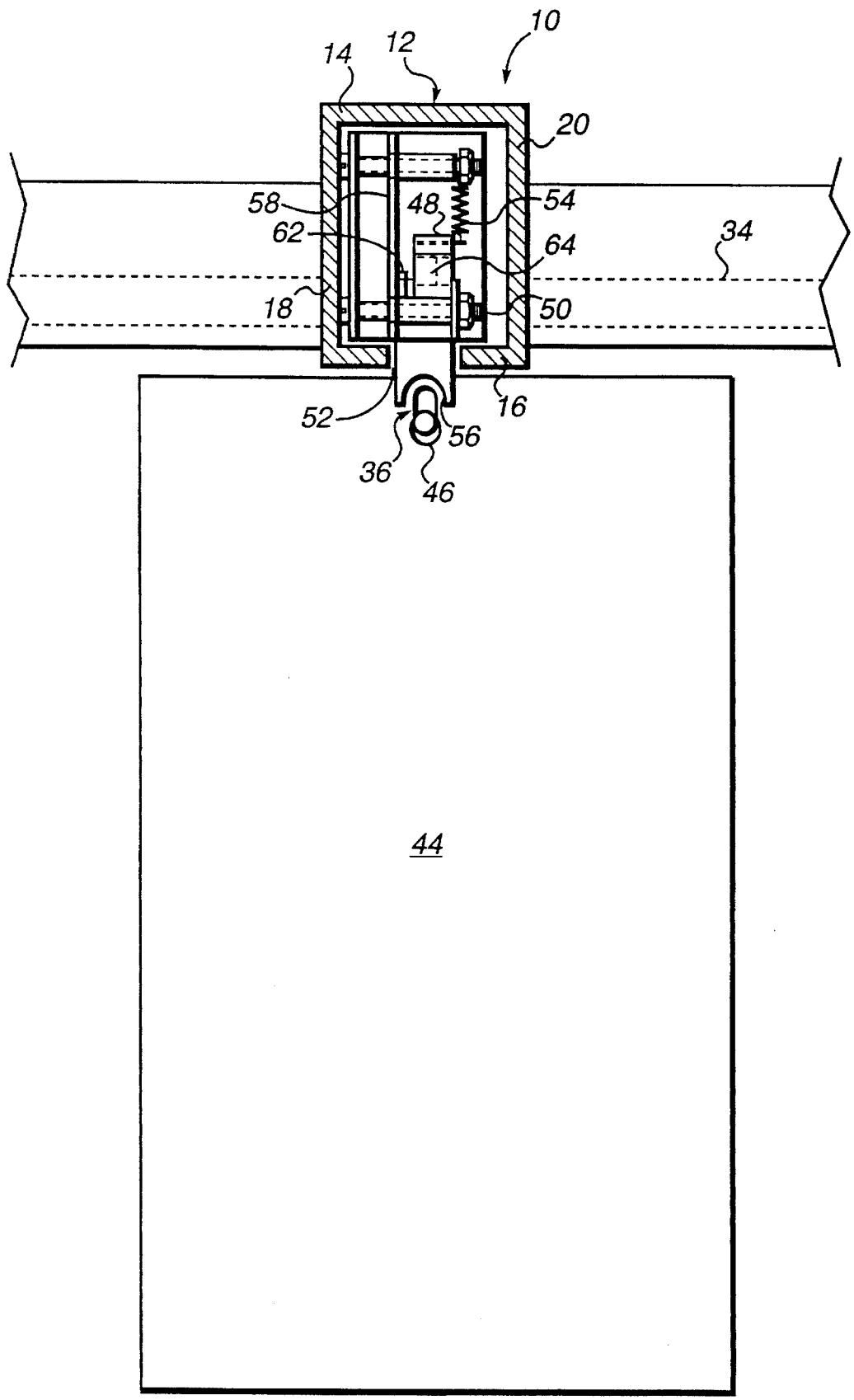
FIG. 2 is front and elevation view of the inventory monitoring apparatus shown in FIG. 1 wherein the housing front wall has been omitted for clarity or illustration.

Referring to FIGS. 1 and 2, there is depicted a first presently preferred embodiment of an inventory monitoring apparatus of the instant invention, which apparatus is generally designated by reference numeral 10. Apparatus 10 comprises an elongated housing 12 including an upper wall 14, a lower wall 16, side walls 18 and 20, a front wall 22 and a rear wall 24. Housing 12 may be formed of any suitable durable material such as plastic or metal. A clip assembly 26 or a similar attachment mechanism is desirably carried by a flange 28 of rear wall 24 whereby the housing may be detachably fastened to a rail or similar support structure 30 affixed to a wall 32, or like surface. As will be discussed in greater detail hereinafter, rail 30 may also carry a communications bus 34 or other suitable means for electrically connecting the apparatus 10 to a similar apparatus or to a remote computer or display station.

An object support means is designated by reference numeral 36. As is illustrated, the object support may assume the form an elongated, rigid and angled rod which may be suitably formed of metal or plastic. A shorter leg 38 of the object support means 36 is affixed, such as by threaded fasteners 40, to the rear wall 24 of housing 12. A longer leg 42 of the object support means 36 extends generally longitudinally of the housing 12 and is capable of supporting a plurality of objects 44. Thus, according to the preferred embodiment, object support means 36 resembles an elongated peg or rod which suspends objects 44 from perforations 46 (FIG. 2) provided herein. The longer leg 42 also desirably is formed with a raised portion 42A to prevent the objects from unintentionally sliding off the object support means. It will be appreciated that apparatus 10 will find beneficial usage with any articles or objects which are suitable for suspension and whose inventory it is desirable to monitor. Typical items may include packages containing drugs or medical equipment supplies such as, for example, catheters and guide wires for angioplasty, or other articles whose inventories should be strictly and accurately monitored because of theft, safety or related concerns. In this connection, the object support means may assume any form necessary to properly support the objects to be monitored. That is, the object support means may be configured as a rack, multiple hooks or pegs or similar cantilevered member(s), a T-bar, or other such constructions.

A switch activating means 48, desirably configured as a pivotable lever, is mounted generally at its midpoint to housing 12 by pivot pin 50. According to a presently preferred construction, a first end of lever 48 projects through an opening 52 in lower housing wall 16. It is also contemplated that lever 48 may be adapted to project through an opening similar to opening 52 that may be provided in any other wall of housing 12 so long as those components necessary for the proper functioning of the apparatus 10 are correspondingly repositioned to accommodate the desired orientation and operation of the lever. A second end of the lever 48 is connected to suitable biasing means 54. For present purposes, a tension spring (as is shown) has been found to be appropriate to impart the necessary biasing force to the lever. As the practitioner will readily appreciate, the biasing means such as torsion springs, compression springs, elastomeric means, or the like, can be effectively used to affect the same results. Biassing means 54 normally biases the lever into an "inoperative" position extending generally transversely to the longer leg 42 of the object support means 36 as depicted in FIG. 1.

It is important that the first end of lever 48 sufficiently project from housing 12 whereby it may be contacted and displaced by an object 44 which may be either added to or removed from the object support means 36. To assure that the lever will interfere with passage of an object, the first end is desirably provided with a notch 56 configured to receive the longer leg 42 of the object support means 36. So assembled, after an object has contacted, displaced and passed the lever (in either direction) the biassing means 54 returns the lever to the inoperative position.

A printed circuit board 58 is affixed to the interior of housing 12. Apart from certain circuitry components specifically identified below which are essential to provide an adequate appreciation of the operation of the instant invention, it will be understood that, as is conventional, circuit board 58 includes printed circuitry and other circuitry components, which components are not illustrated for purposes of clarity.

Electrical switch means are supported by and electrically connected to the circuit board 58. During operation, the switch means generate signals indicative of placement of objects onto and removal of objects from the object support means 36. The presently preferred embodiment of the instant invention utilizes a pair of switch elements 60 and 62 as the electrical switch means. Most preferably, the switch elements are Hall effect sensors which change states (off-to-on) when a magnetic field is detected within close proximity. Accordingly, the lever 48 carries a suitable actuator means in the form of a compact permanent magnet 64 whose magnetic field is capable of being sensed by switches 60 and 62 to effect changes in their status. The signals indicating changes in the status of the switches are detected by a signal processing circuit 65 which converts the signals to an appropriate form to be received and counted by a microprocessor 66 described in greater detail hereinafter.

Figure 3:
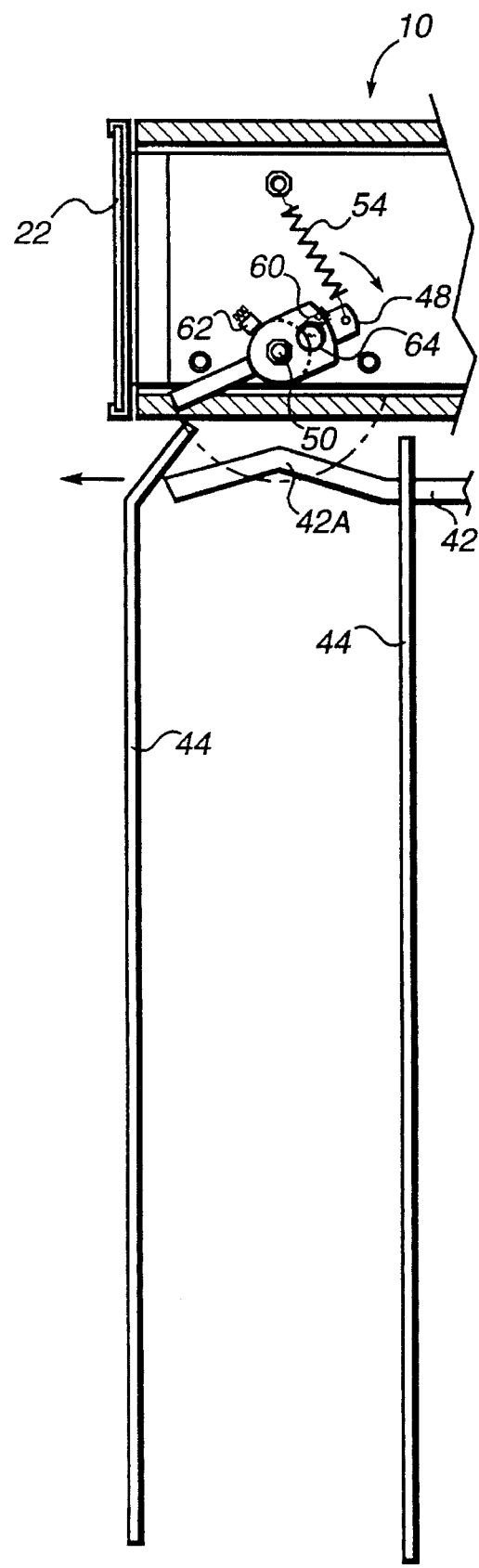
FIG. 3 is a view similar to FIG. 1 depicting an article being removed from the inventory monitoring apparatus.

Operation of the inventory monitoring apparatus 10 is graphically represented in FIG. 3. Specifically, an object 44 is shown at the instant in time when it has fully deflected the lever 48 against the force of biassing means 54 and has just passed the first end of the lever. At this moment, the permanent magnet 64 is pivoted into substantially facing relationship with magnetic field detector switch 60. Switch 60 is triggered upon detection of the magnetic field of the permanent magnet to generate a signal indicating that an object has been removed from the object support means 36. In the next instant in time the biassing means returns the lever to the inoperative position. Similarly when an object is placed onto the object support member, the lever is oppositely pivoted, thereby causing the permanent magnet to trigger the magnetic field detection switch 62 to generate a signal indicating that an object has been added to the object support means. Although magnetic field detection switches are presently preferred, other suitable switches such as a three-way toggle switch, photosensitive switches, capacitive or inductive sensors, and the like, may be employed to effect generation of the additive and subtractive article registration signals. Likewise, the switch activating means may assume forms other than a pivotable lever, e.g., a linearly reciprocable lever or a flexible flap.

A microprocessor 66 (FIG. 1) receives through a suitable signal processing circuit 65 the signals generated by the switches 60 and 62. The microprocessor contains software programs which record the state of the switches each time a change is detected, as well as count and store the number and direction of changes in state as they occur.

The electronic circuitry of the inventory monitoring apparatus 10 also has the ability to communicate its count information to another computer system. In this regard, software is provided in both the circuit board 58 and the external computer system to establish a protocol whereby the apparatus 10 can transmit its data in an orderly fashion when other such apparatus and devices are attached to the same computer system. Data is digitally encoded and transmitted in a manner that is similar to a standard local area network. To effect the desired data transmission the apparatus 10 preferably additionally includes a multiple function ribbon cable 68 in communication with the circuit board 58. Cable 68 advantageously possesses both power and data transmission lines and is fitted at its free end with an electrical coupling 70 which is configured to couple with communications bus 34. In this manner, circuit board 58 may receive power from a remote, typically DC, power source (not illustrated) via bus 34 and certain lines of the ribbon cable 68 while other lines of cable 68 simultaneously transmit the real-time count being tallied by the microprocessor 66 to bus 34 and, ultimately to the external computer system or to a remote display station where the count can be visually monitored. As will be appreciated, separate power and data transmission cables may be suitably employed in lieu of ribbon cable 68.

Among other design variations, the housing 12 may include a visual display means such as an LCD or LED display in addition to or in lieu of the remote display station. Further, although the presently preferred embodiment finds the apparatus 10 being powered by remote DC power, it is also contemplated that the apparatus may also function under local DC power, including a battery contained within housing 12, or by an AC power source. Additionally, the electronics need not be located within the housing. For example, a circuit board such as board 58 could be located remotely housing with wires connecting the switches 60 and 62 to the circuit board. There also need not be any object support means. Hence, the apparatus 10 may be appropriately dimensioned and positioned in an area access way such that ingress to or egress from the area necessitates displacement of switch activating means 48 or otherwise operates the electrical switch means to trigger the aforesaid registration signals.

Figure 4:
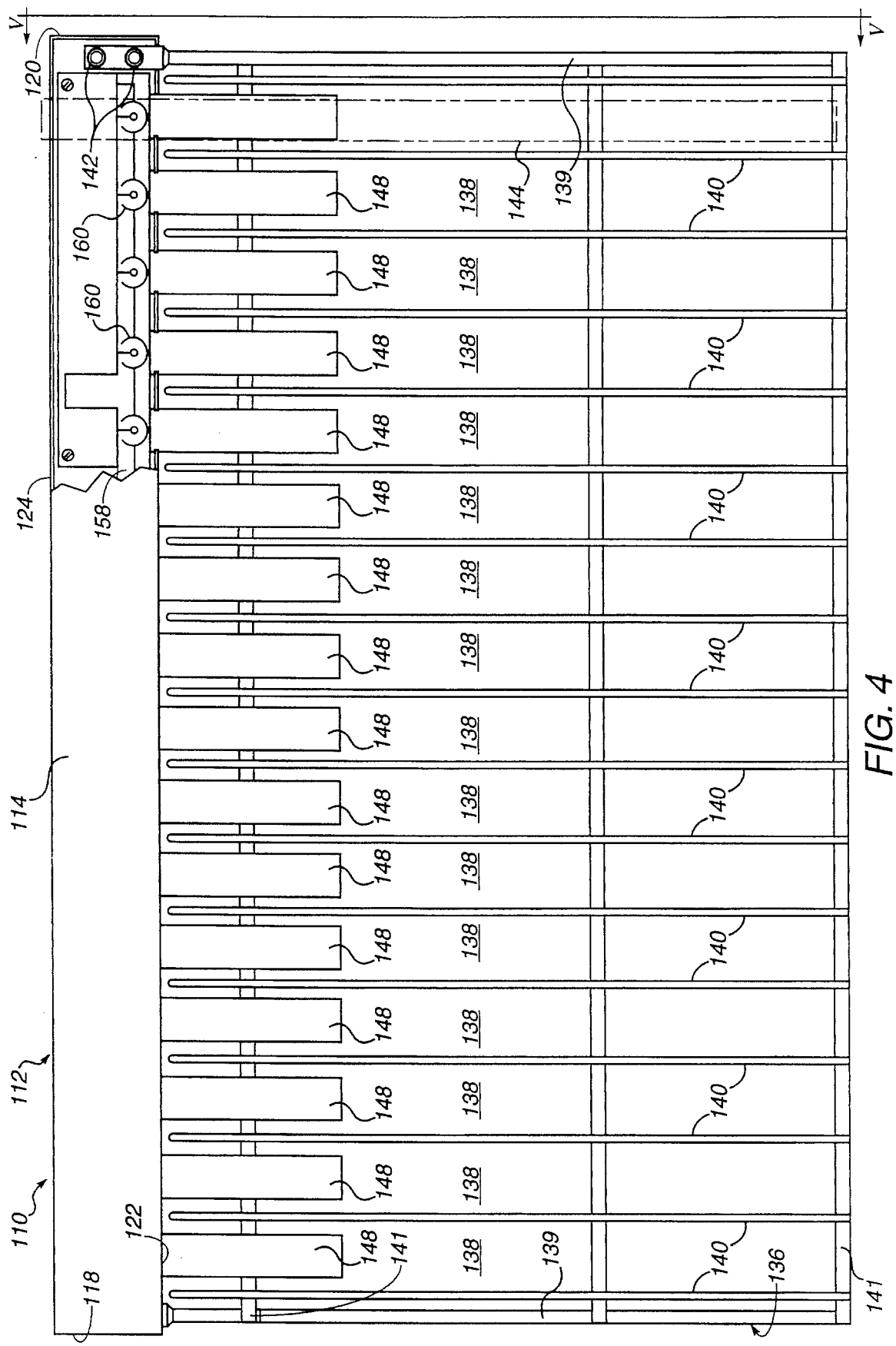
FIG. 4 is a partially cutaway top plan view, with certain elements omitted for clarity of illustration, of a further preferred embodiment of an inventory monitoring apparatus constructed according to the present invention.
Figure 5:
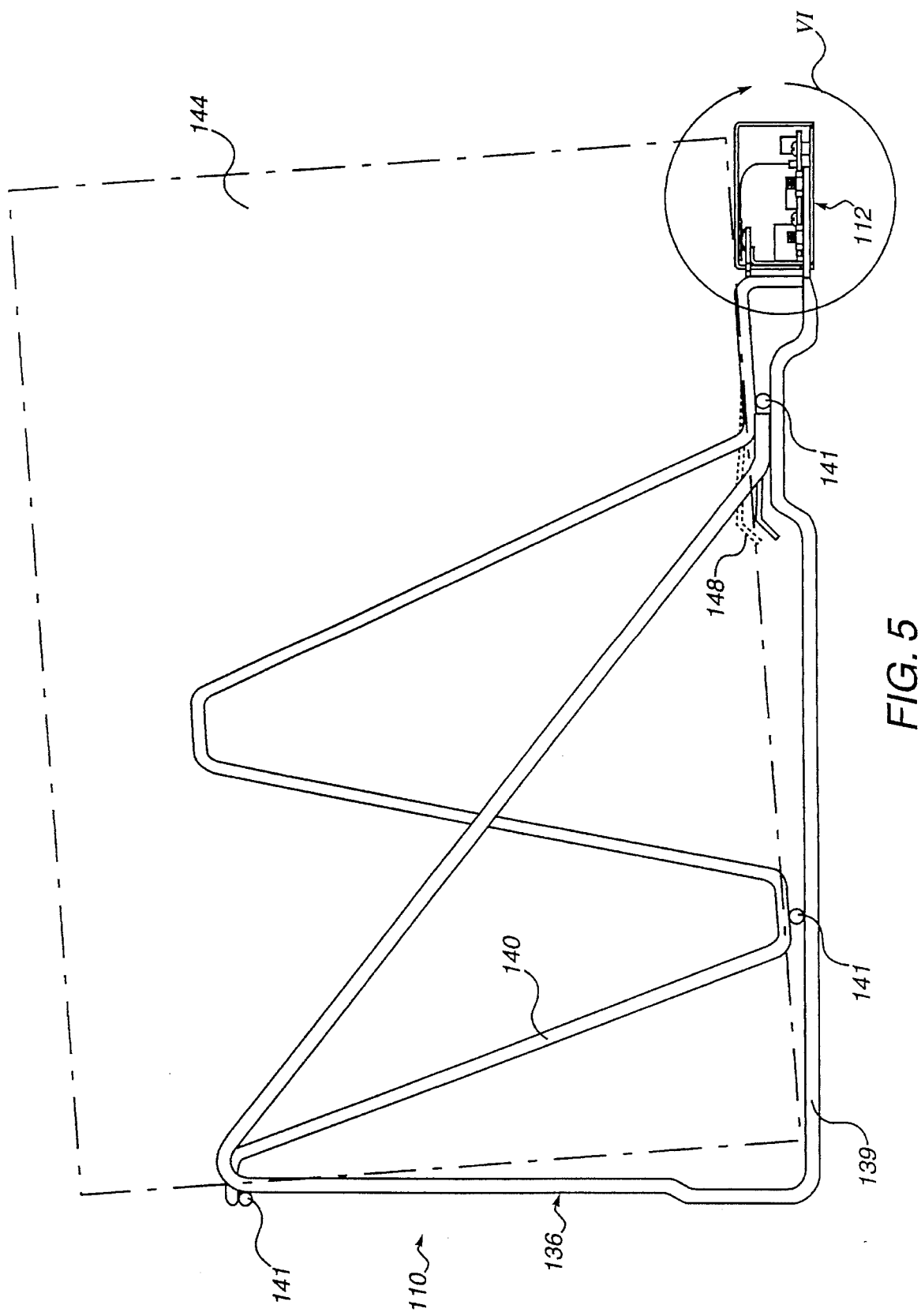
FIG. 5 is a side elevation view of the apparatus of FIG. 4 as seen from line V—V of FIG. 4, and wherein a housing end wall has been omitted for clarity of illustration.
Figure 6:
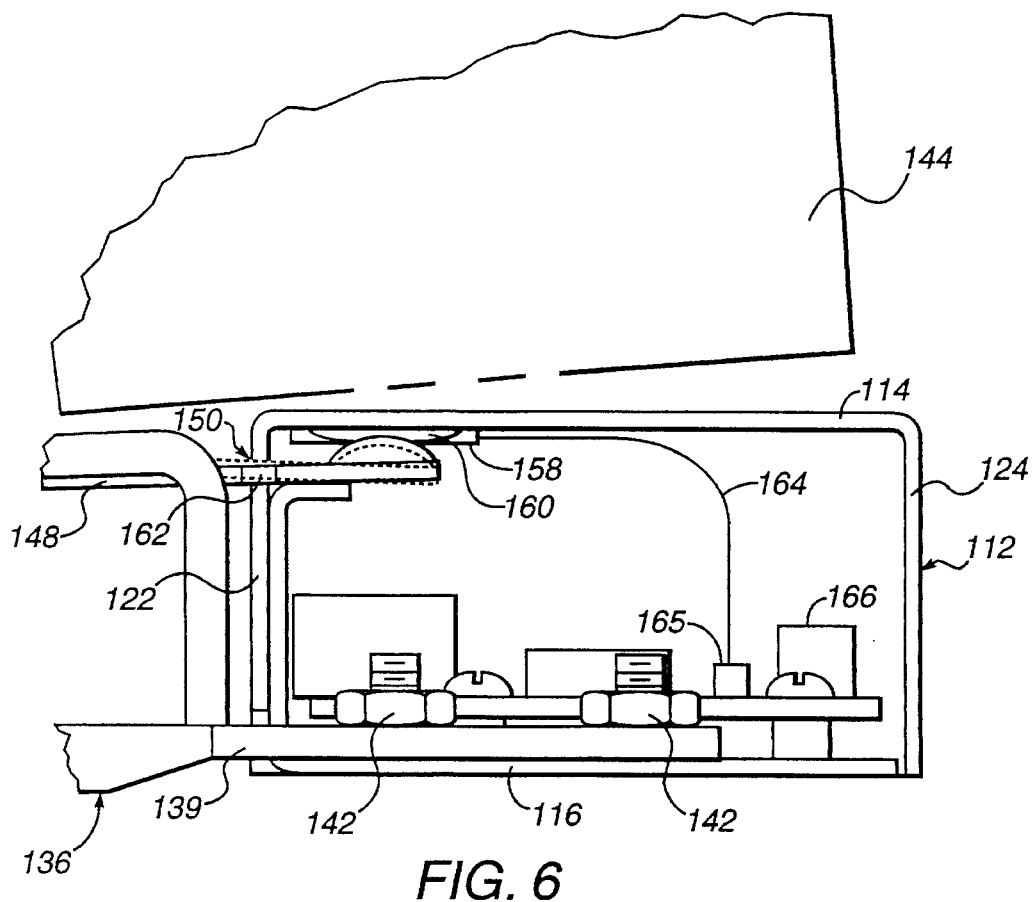
FIG. 6 is an enlarged view of circled portion VI of FIG. 5.

FIGS. 4 through 6 reflect a further presently preferred embodiment of an inventory monitoring apparatus, herein designated by reference numeral 110, constructed in accordance with the instant invention. Apparatus 110 includes an elongated housing 112 including an upper wall 114, a lower wall 116, end walls 118 and 120, a front wall 122 and a rear wall 124. Like housing 12 of apparatus 10, housing 112 may be fabricated from any durable material such as plastic or metal. Although not shown, it will be understood that a clip assembly similar to clip assembly 26 of FIGS. 1 and 2, or a similar attachment mechanism, may be used to detachably fasten the housing to a wall. Alternatively, the apparatus 110 may simply rest on a level shelf, table top or cabinet. Furthermore, the structure to Which apparatus 110 may be attached or supported may carry a communications bus, similar to bus 34 of FIGS. 1 and 2 or some other acceptable electrical communication means, for electrically connecting the apparatus 110 to a similar apparatus or to a remote computer or display station.

Pursuant to this particular embodiment, an object support means is represented by reference numeral 136, which means may assume the form of a receptacle having at least one or, preferably, a plurality of compartments or object storage sites 138. According to a presently preferred design, object support means 136 is constructed as a multiple compartment heavy gauge, stiff metal wire rack including a pair of upright, truss-like end walls 139, a plurality of spaced-apart storage site divider walls 140 situated between and generally parallel to the end walls 139, and a plurality of transverse members 141 affixed to the end walls 139 and divider walls 140. The end walls 139 are desirably secured by suitable mechanical fastening means 142, such as nuts and bolts or the like, to the lower wall 116 (as shown) or any other wall of the housing 112.

As constructed in the figures, the object support means 136 is adapted to support objects 144 of substantially uniform dimensions (one of which is shown in phantom line in FIGS. 4 through 6) in substantially upright orientation. For example, objects 144 may be generally uniformly sized, relatively thin boxes or similar packages which may contain virtually and desired goods or products. The object support means as illustrated is thus capable of supporting an object on four sides thereof, i.e., the bottom, back and both lateral sides of the object (see FIGS. 4 and 5). In this fashion, an object 144 may be removed from the object support means 136 simply by lifting it forward (to the right in FIG. 5) and/or upward. Desirably, the bases of the divider walls 140 are situated at a lower elevation than the upper wall 114 of housing 112 (FIG. 5), whereby the objects 144 are caused to be tilted slightly rearwardly such that the back sides of the objects maintain contact with the rear of the object support means 136.

Although the presently preferred embodiment of the object support means 136 supports objects 144 in substantially upright or vertical position, the present invention also contemplates rack geometries whereby objects may be supported substantially horizontally, at acute angles or in a staggered array incorporating one or more angular support orientations. Furthermore, the spacing between the divider walls 140 need not be uniform, in which case storage sites 138 of variable dimensions may be provided in the same object support means 136. And, the object support means 136, like housing 112, may be fabricated, in addition to metal, from any high strength, substantially rigid plastic or other suitable material.

Apparatus 110 further comprises switch activating means 148. In accordance with a presently preferred arrangement, switch activating means 148 includes one or more levers pivotally mounted at 150 (FIG. 6) to housing 112 in a manner to be described in greater detail hereinafter. The levers 148 desirably correspond in number to the number of compartments or storage sites 138 provided in the object support means 136. A first end of each lever 48 projects from the housing 112 into a respective one of the storage sites 138 and a second end of each lever ends into the housing (as is perhaps most clearly seen in FIG. 6). The first end of each lever protrudes from the housing for a distance sufficient to be contacted and displaced by an object 144 which may be added to the object support means 136. Biassing means (to be discussed later) return the levers to inoperative positions upon removal of the objects from the storage sites of the object support means.

Referring to FIGS. 4 and 6, as with inventory monitoring apparatus 10 described above, apparatus 110 likewise has a printed circuit board, herein designated by reference numeral 158, which is preferably affixed to the interior of housing 112. And, like circuit board 58, circuit board 158 includes printed circuitry and other conventional circuitry components which are not illustrated or described in detail except where necessary for a proper understanding of the present invention.

Circuit board 158 is preferably mounted on the interior surface of the upper wall 114 of housing 112 and extends substantially the entire length thereof.

Electrical sensor means are supported by and electrically connected to circuit board 158. The sensor means generate signals indicative of placement of objects onto and removal of objects from the object support member 136. According to a presently preferred construction, the sensor means comprise one or more discrete, force actuatable switches 160, such as, for example, snap type, internally resilient dome switches or the like. Switches 160 are spaced apart along the length of circuit board 158 and correspond in number to the levers 148 whereby the second end of each lever operates a separate switch.

So constructed and arranged, the switches 160 may generate not only real-time counting signals reflective of the total inventory of objects 144 carried by the object support means 136 but also real time signals indicative of those storage sites which are occupied and those which are unoccupied at any instant in time. Thus, when a lever 148 is caused to pivot in one direction such as when an object is placed into a storage site of the object support means, the second end of the lever closes its respective switch 160, as is reflected by the solid line image of lever 148 depicted in FIGS. 5 and 6. Switch 160, in turn, generates a registration signal indicating that an object has been placed onto the object support member and at which storage site 138 the object has been added.

Conversely, when an object is removed from the object support means, the internal resilience of the dome switch 160 returns the lever to its inoperative position, as is reflected by the dashed line image of lever 148 illustrated in FIGS. 5 and 6, whereby the switch is opened. In this position, the switch generates a registration signal which reflects that an object has been removed from the object support means and from which storage site the object has been taken. Additionally, if mechanical switches other than dome type or similar switches possessing internal resiliency are employed as the electrical switch means, then biassing means such as springs or elastomeric means must be provided to assure that the switches are opened upon removal of objects from the object support means 136.

Figure 7:
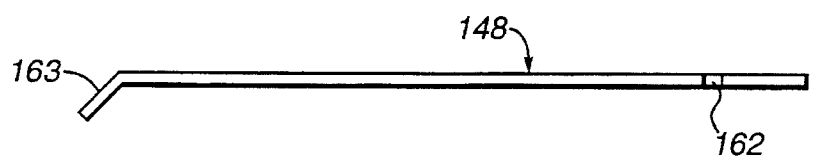
FIG. 7 is a side view of a presently preferred lever adapted for use in the inventory monitoring apparatus of FIGS. 4 through 6.
Figure 8:
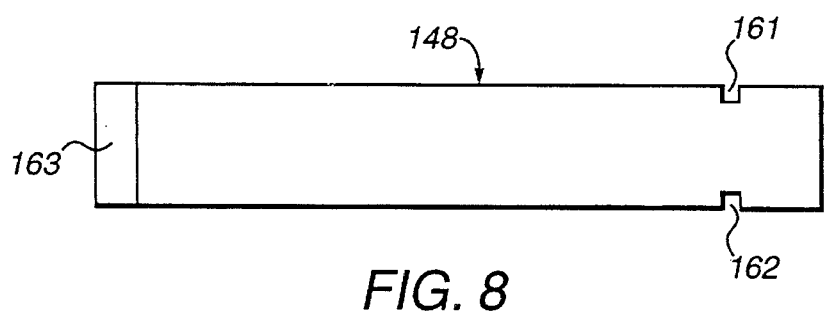
FIG. 8 is a top plan view of the lever of FIG. 7.

FIGS. 7 and 8 show, on an enlarged scale, a preferred configuration of a lever 148. The lever desirably includes a pair of opposed notches 161, 162 which generally separate the lever into its first and second ends and, in cooperation with mating slots provided in the front wall 122 of housing 112, establish the pivotal connection 150 of the lever relative to the housing. Further, each lever 148 is preferably provided with a downwardly sloping lip 163 at the leading edge of its first end to facilitate insertion of the objects 144 into the storage sites 138.

Although dome type switches are presently preferred for this particular embodiment of the inventory monitoring apparatus of the present invention, other suitable sensor means such as a two-way toggle switch, photosensitive switches, capacitive or inductive sensors, and the like may be employed to effect generation of the additive, subtractive and object locating registration signals.

The signals indicating changes in the status of the switches 160 are transmitted by wire or other acceptable signal conducting means 164 (FIG. 6) whereupon they are detected by a signal processing circuit 165 which converts the signals to an appropriate form to be received and counted by a microprocessor 66. The microprocessor, like microprocessor 66 of inventory monitoring apparatus 10 described above, contains software programs which record the state of the switches each time a change is detected, as well as count and store the number and direction of changes in state as they occur. Moreover, the software of the microprocessor 166 possesses the additional capability to continuously scan the status of the switches to retrieve and record information reflective of those storage sites that are occupied and those that are unoccupied at any moment in time.

While not illustrated, it will be appreciated that apparatus 110 may be remotely powered and/or connected to communicate with another computer system or remote display station in a manner generally similar to that described above in connection with apparatus 10. And, similarly to apparatus 10, apparatus 110 may be equipped with an LED or LCD display; it may be AC powered or locally or remotely DC powered; and its electronics may be remotely located rather than internally of the housing 112.

An inventory monitoring apparatus constructed according to apparatus 110 is particularly well adapted for supporting and tracking in real-time inventories of objects packaged in generally uniformly sized and shaped containers (although, as mentioned above, its potential applications extend far beyond such narrow usage). Nevertheless, it is common for pharmaceuticals and medical equipment supplies such as catheters and angioplasty guide wires to be packaged in relatively thin rectangular boxes. Such goods or other valuable or potentially dangerous items that may be similarly packaged and whose inventories should be strictly and accurately monitored, are readily accommodated by apparatus 110. Also, when different packages in the same rack or object support means contain different goods, apparatus 110 enables the contents of the inventory to be correlated with selected compartments or storage sites within the rack. Thus, not only may the presence or absence of particular product packages be determined in real-time, but a running inventory of types of goods contained in the packages may be had as well.

Additionally, although depicted and described as a relatively simple rack, the object support means 136 may comprise a multi-tiered rack or a plurality of rows and/or columns of cubicles wherein each of the storage sites or cubicles may be appropriately fitted with a switch actuating means such as lever 148.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Apparatus for real-time counting of objects added to or subtracted from a location having a plurality of storage sites and whose inventory is to be monitored, said apparatus comprising:

sensor means for generating a first signal indicative of an object being added to said location, a second signal indicative of an object being subtracted from said location and a third signal indicative of which of said plurality of storage sites an object was added or subtracted;

said sensor means being operable to detect movement of an object in one direction to generate said first signal, movement of an object in a generally opposite direction to generate said second signal and movement of an object in said one direction or said generally opposite direction to generate said third signal; and means operatively connected to said sensor means for counting said signals generated by said sensor means to provide a real-time total of said objects at said location and a real-time identification as to which of said plurality of storage sites said objects are located.

2. The apparatus of claim 1 further comprising means for supporting objects, said means for supporting objects serving as said location.

3. The apparatus of claim 2 wherein said means for supporting objects is a rack.

4. The apparatus of claim 1 further comprising means for actuating said sensor means, said actuating means being situated for contact by said objects and displaceable into first and second positions by movement of said objects to and from said storage sites, whereby in said first position said actuating means causes said sensor means to generate said first signal and a third signal indicative of which of said plurality of storage sites an object was added, and in said second position said actuating means causes said sensor means to generate said second signal and third signal indicative of which of said plurality of storage sites an object was subtracted.

5. The apparatus of claim 4 wherein said actuating means comprise a plurality of levers corresponding in number to said plurality of storage sites and said sensor means comprise a plurality of sensors corresponding in number to said levers.

6. The apparatus of claim 5 wherein said levers are pivotally supported by said apparatus.

7. The apparatus of claim 1 wherein said counting means is a microprocessor.

* * * * *